United States Patent
Arun et al.

[19]

[11] Patent Number: 5,933,593
[45] Date of Patent: Aug. 3, 1999

[54] METHOD FOR WRITING MODIFIED DATA FROM A MAIN MEMORY OF A COMPUTER BACK TO A DATABASE

[75] Inventors: Gopalan Arun, Nashua, N.H.; Richard Frank, Groton, Mass.; William A. Wright, Bedford; Richard Anderson, Nashua, both of N.H.

[73] Assignee: Oracle Corporation, Redwood Shores, Calif.

[21] Appl. No.: 08/819,596

[22] Filed: Mar. 17, 1997

Related U.S. Application Data

[63] Continuation-in-part of application No. 08/787,551, Jan. 22, 1997.
[51] Int. Cl.[6] .................................................. G06F 11/00
[52] U.S. Cl. ................................ 395/182.04; 711/11 A
[58] Field of Search ..................... 395/182.03, 182.04, 395/182.17, 182.18, 185.01, 185.05; 711/114

[56] References Cited

U.S. PATENT DOCUMENTS

| | | | |
|---|---|---|---|
| 5,608,865 | 3/1997 | Midgely et al. | 395/182.04 |
| 5,734,814 | 3/1998 | Corbin et al. | 395/182.04 |
| 5,774,643 | 6/1998 | Lubbers et al. | 395/182.04 |

*Primary Examiner*—Robert W. Beausoliel, Jr.
*Assistant Examiner*—Pierre E. Elisca
*Attorney, Agent, or Firm*—Wagner, Murabito & Hao

[57] ABSTRACT

In a client/server computer system, a method for writing modified data in a cache memory back to a database residing in a hard disk drive. Rather than writing back all of the modified data as part of a checkpointing operation, the present invention designates an amount of the cache memory that is to be cleared for a pre-determined time interval. The amount of cache memory to be cleared is based on an estimate of how much new data is anticipated to be cached. Thereby, just enough memory is cleared and made available so as to accommodate the storage of new data. For the modified data which are to be written back to the database, a lazy writeback operation is utilized.

14 Claims, 11 Drawing Sheets

METHOD FOR WRITING MODIFIED DATA FROM A MAIN MEMORY OF A COMPUTER BACK TO A DATABASE

This application is a continuation-in-part of copending application Ser. No. 08/787,551 filed on Jan. 22, 1997 and which designated in the U.S.

FIELD OF THE INVENTION

The present invention pertains to a method for writing modified data from a main memory of a computer system back to a database.

BACKGROUND OF THE INVENTION

Computers have become an integral tool used in a wide variety of different applications, such as in finance and commercial transactions, three-dimensional and real-time graphics, computer-aided design and manufacturing, healthcare, telecommunications, education, etc. Computers are finding new applications as their performance and speeds ever increase while costs decrease due to advances in hardware technology and rapid software development. Furthermore, a computer system's functionality and usefulness can be dramatically enhanced by coupling stand-alone computers together to form a computer network. In a computer network, users may readily exchange files, share information stored on a common database, pool resources, communicate via e-mail and even video teleconference.

One popular type of network setup is known as "client/server" computing. Basically, users perform tasks through their own dedicated desktop computer (i.e., the "client"). The desktop computer is networked to a larger, more powerful central computer (i.e., the "server"). The server acts as an intermediary between a group of clients and a database stored in a mass storage device. An assortment of network and database software enables communication between the various clients and the server. Hence, in a client/server arrangement, the data is easily maintained because it is stored in one location and maintained by the server; the data can be shared by a number of local or remote clients; the data is easily and quickly accessible; and clients may readily be added or removed.

Although client/server systems offer a great deal of flexibility and versatility, people are sometimes reluctant to use them because of their susceptibility to various types of failures. Furthermore, as computers take on more comprehensive and demanding tasks, the hardware and software become more complex and hence, the overall system becomes more prone to failures. A single server failure may detrimentally affect a large number of clients dependent on that particular server. In some mission critical applications, computer downtimes may have serious implications. For example, if a server fails in the middle of processing a financial application (e.g., payroll, securities, bank accounts, electronic money transfer, etc.), the consequences may be quite severe. Moreover, customer relations might be jeopardized (e.g., lost airline, car rental, or hotel reservations; delayed or mis-shipped orders; lost billing information; etc.).

Short of totally eliminating all failures which might disable the computer system, the goal is to ensure that data is not lost because of a failure. One prior art mechanism for accomplishing this goal is known as "checkpointing." Basically, checkpointing periodically updates the data stored in the database. Thereby, when the computer system becomes disabled, data can be recovered. FIG. 1 is a diagram describing a typical prior art computer system having checkpointing. The system may incorporate a number of clients 101–109 (e.g., personal computers, workstations, portable computers, minicomputers, terminals, etc.) which are serviced by one or more servers 110 and 111. Each of the clients interacts with server nodes 110 and 111 through various client programs, known as "processes", "workers", "threads", etc. Each of the server nodes 110 and 111 has its own dedicated main memory 113 and 114. Data from a large commonly shared storage mechanism, such as a disk array 112, is read into the main memories 113 and 114. Thereby, vast amounts of data stored in the form of relational databases residing in the disk array 112 are accessible to either of the servers 110 and 111 for distribution to the various clients 101–109. As data is changed by the users, the modified data is stored back into the main memories 113 and 114. The data is then marked to indicate that they have been changed. Periodically, the marked data is checkpointed back to the database residing in disk array 112. This involves writing all marked data to their corresponding locations in disk array 112. In addition, all changes made after the most recent checkpoint are recorded into a separate log file 115.

When one of the server nodes 110 or 111 crashes, it loses all data contained in its respective main memory. However, most of changes to the data have already been copied over to the database during the last checkpoint. The database is stored in the nonvolatile disk array 112. Hence, the data is not lost, even though power is unexpectedly terminated. Upon recovery, this data can be read from the database and stored back into the main memory. Furthermore, the most recent changes to the data made since the last checkpoint are read back from the log file 115 and made to the main memory.

Although checkpointing addresses the main problems of data recovery and preservation, it nevertheless, has several drawbacks. Namely, checkpointing is very costly to implement in terms of processing time. There is a severe performance penalty associated with checkpointing primarily because the marked records have to be written back to various disk locations in the database. These locations are usually scattered throughout different physical locations of the disk array 112. Often, thousands of transactions need to be updated during each check point. And each of these transactions typically require its own separate input/output (I/O) operation to gain access to the desired location. Furthermore, if the page to which the data is to be written back is not currently in the main memory, the page must first be read off the disk; the data must then be merged with that page; and the page must then be written back to the disk. This sequence of events requires two synchronous I/O operations. Thus, it is not uncommon for checkpointing to take upwards of half an hour or more to complete. In the meantime, the server is prevented from performing other functions while checkpointing is being processed.

As the above discussion illustrates, the prior art checkpointing method does not perform checkpointing in a wholly satisfactory manner. Therefore, a more efficient mechanism is needed to address the problems of data recovery and preservation.

SUMMARY OF THE INVENTION

As an alternative to the prior art checkpointing mechanism wherein marked data is written to scattered sections of a mass storage, checkpointing may be performed in a more efficient sequential manner. That is, modified data in memory is first gathered into a sequence of modified data records; then the sequence of modified data records is written to disk as a sequential write operation. Because the write operation is a sequential one, the seek time associated with writing data scattered throughout a mass storage is eliminated. Such a sequential checkpointing mechanism is described in related application U.S. Serial No.

A point to note with regard to sequential checkpointing is that the sequence of modified records is preferably written to separate checkpointing disk or mass storage. The records are not written into the mass storage in which the database is stored. Because of this, the modified records have not made their way into the database. Therefore, in a system wherein checkpointing is done sequentially, there is a need for a mechanism whereby modified data records are written back to the database to update the database. The present invention provides such a mechanism.

According to the present invention, a database administrator first designates an amount of the cache memory that is to be cleared within a predetermined time interval. The amount of cache memory to be cleared is based on an estimate of how much new data is anticipated to be cached during that time interval. Thereby, just enough memory is cleared and made available so as to accommodate the storage of the new incoming data.

Writing back and making available a portion of memory as needed is more efficient than writing back all of the modified data associated with a checkpointing operation.

In one embodiment, the actual writeback of the modified data is performed lazily according to two approaches. In a first approach applicable to record caches, whenever a transaction commits, the server checks the records which were modified by that transaction. If the page in which one of these records coincidentally happens to be available in memory, the modified record is copied into that page and then the record is unmarked. Thereby, the normal overhead associated with reading the page from the disk array is avoided. Eventually, the page is opportunistically cycled back to the database according to a "least recently used" scheme. The second approach involves using a cache sweeper process to sweep marked records back to the database. The number of records swept per second is a controllable function. Furthermore, a number of helper processes can be designated to aid in the sweeper function. A designated helper process, in the course of executing its transactions, checks to determine whether it is accessing any marked record in the cache. If a marked record is being accessed, the designated helper writes the marked record back to the database and unmarks that record.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for performing checkpointing in a database through high-speed sequential I/O to one or more disks is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

SYSTEM COMPONENTS

Figure 1:
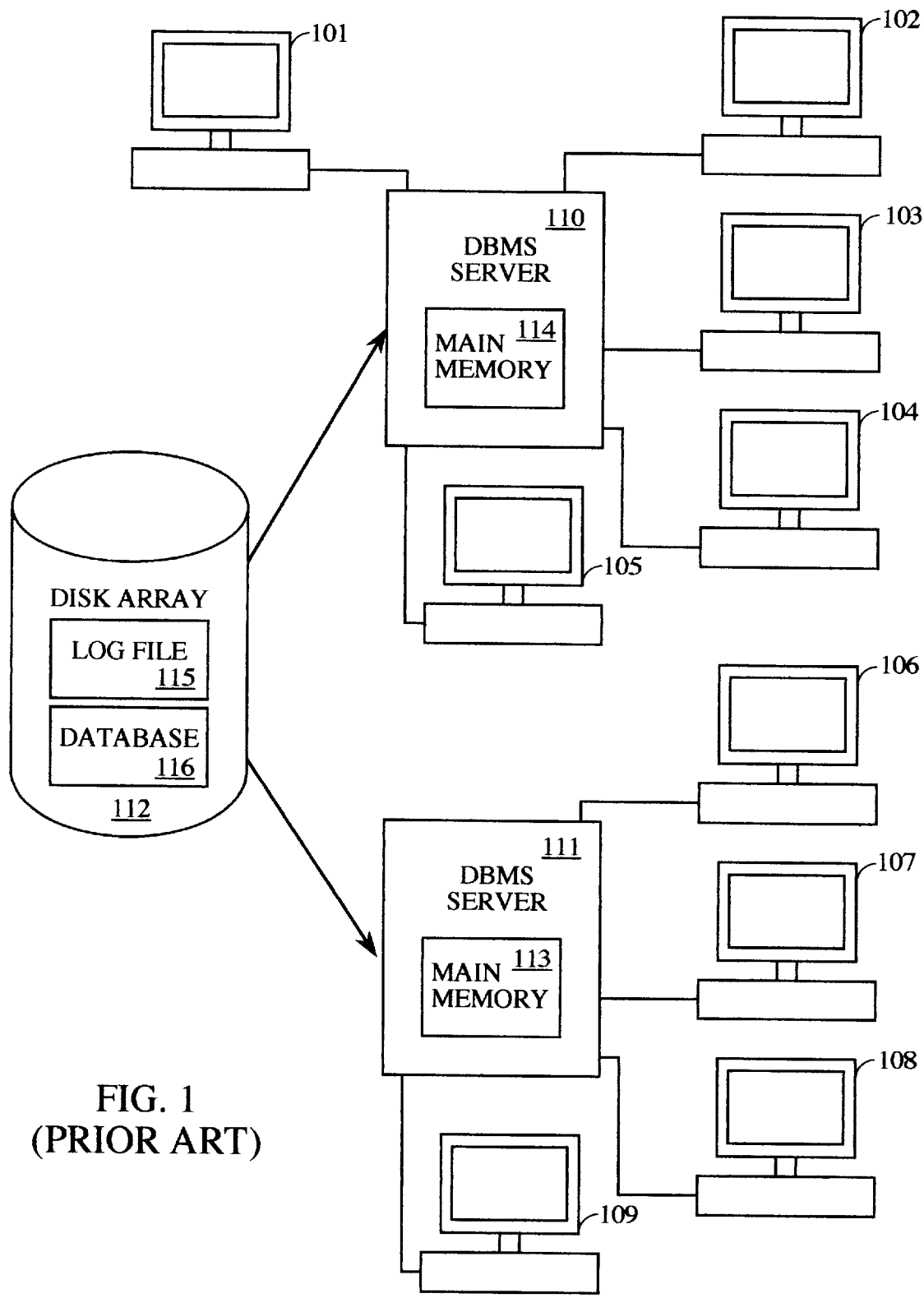
FIG. 1 is a diagram describing a typical prior art computer system having checkpointing.
Figure 2:
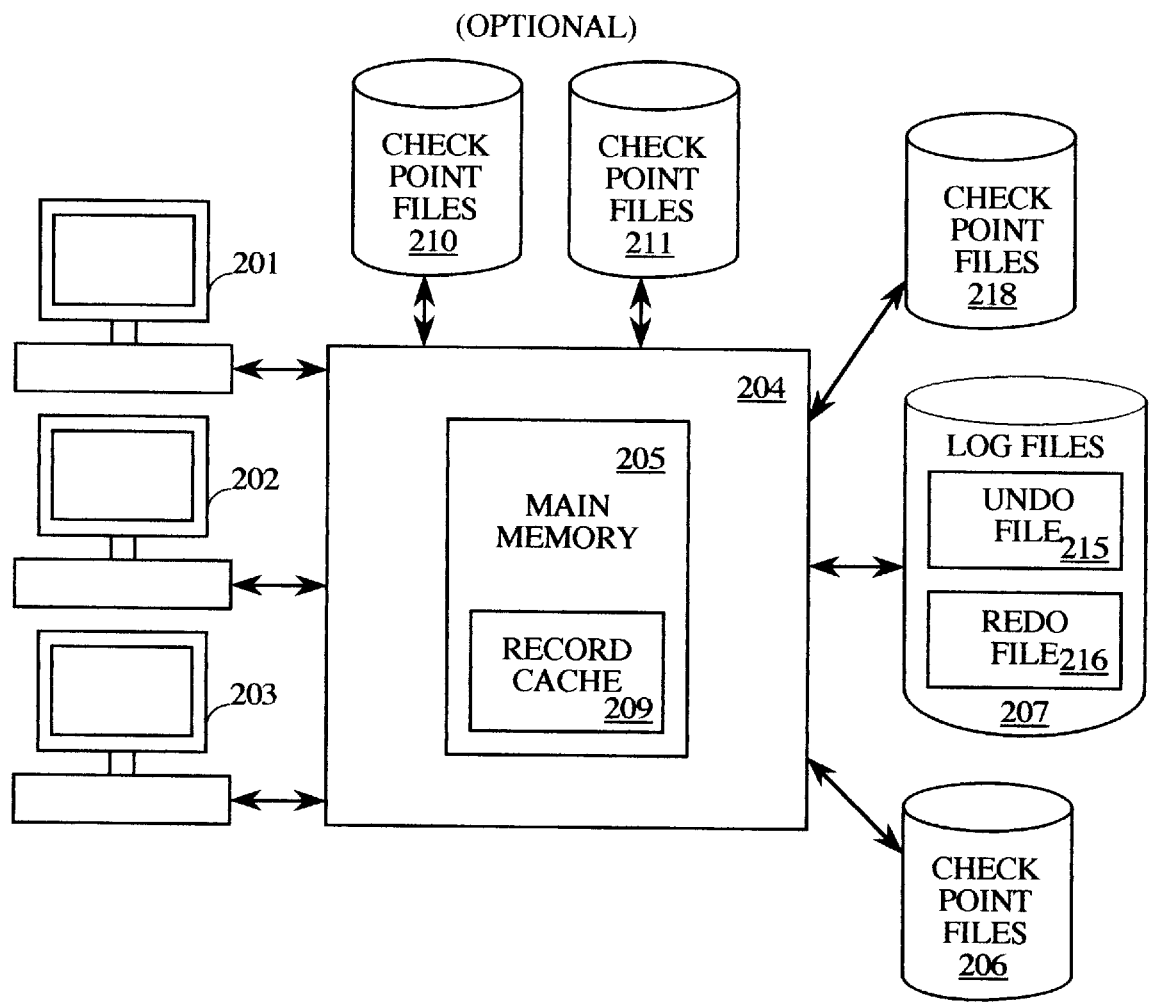
FIG. 2 shows a block diagram of a client/server system upon which the present invention may be practiced.

FIG. 2 shows a block diagram of a client/server system upon which the present invention may be practiced. A number of clients 201–203 are coupled to a server 204. Users run application programs (e.g., spreadsheets, inventory control, schedules, etc.) on the client computers. A database management system (DBMS) runs on server 204. The DBMS is a piece of software that manages access to a database. Server 204 is coupled to disk array 206, log files 207, and checkpoint files 208. The actual database is stored in a plurality of tables which can reside on several of the disks of disk array 206. Whenever clients request particular records, the pages containing the requested records are read from the disk array 206 and put into main memory 205. Main memory 205 consists of gigabytes of random access memory (RAM). In the currently preferred embodiment, a small page cache is utilized to temporarily store several pages of data. Different pages are swapped in and out of the page cache according to read/write requests. A record cache 209 is often maintained in the page cache. The record cache temporarily stores specific records from those pages. Thereby, a record cache 209 makes more efficient use of the existing memory. Rather than storing an entire page (e.g., 10K bytes long), only the relevant record contained within that page (e.g., 20 bytes of data) is cached. It should be noted, however, that the present invention can be applied to systems having record caches as well as those that operate directly from the page layer and do not have record caching abilities. Processes running on server 204 then fill the requests generated by the various clients 201–203. Thereby, the clients 201–203 gain access to the requested records maintained by the DBMS.

UNDO AND REDO LOGGING

Whenever a read request is generated by one of the clients, the server 204 first checks the record cache 209 to determine whether the requested data currently exists in the record cache 209. If the record cache 209 does contain the requested data, that particular entry is simply read. However, if the requested data cannot be found in the record cache 209, an I/O operation to the disk array 206 is performed. The requested data read from disk array 206 is written into the record cache 209. If a client subsequently modifies a record (e.g., change of sales information), that record is marked as having been modified. The new modified record is stored in the record cache. In addition, each time a record is modified, two journal entries are made to the log files 207. The first journal entry, known as the before image, corresponds to the original record. The purpose of the before image is to retain that record in case a server failure occurs before that transaction commits. The first entry is saved in the "undo" log 215. The second journal entry, known as the after image, corresponds to the new modified record. The second entry is saved in the "redo" log 216. Once that transaction commits, the new modified record is stored as the after image journal entry into the log file. For example, if a record is changed from $200 to $300, a before image journal entry of $200 is stored into the "undo" log 215. If the server crashes and contents in main memory 205 are lost, the $200 record can be recovered from the before image contained in the "undo" log file 215. After the user decides to make this change permanent, a command is issued to commit that particular transaction. Thereupon, an after image journal entry of $300 is stored into the "redo" log file 216. Now when the server crashes, the new $300 record is retained in the "redo" log file 216 and can be read back into main memory 205.

CHECKPOINTING

In the present invention, checkpointing is periodically performed to dedicated checkpoint files 208. The actual checkpointing process involves copying all of the modified data from main memory 205 (and record cache 209) directly into the checkpoint files 208 with one or more sequential I/O operations. In other words, the modified records are written to the checkpoint files 208 in one continuous, uninterrupted bit stream. By performing the writing sequentially, checkpointing can be performed much faster than conventional checkpointing techniques which write modified data back to the database with numerous random, scattered I/O operations. Each scattered I/O operation requires its own seek to move the transducers to the actual physical location of the data to be modified. In contrast, the present invention writes the modified data in a continuous, sequential stream. By writing the data sequentially, the time for performing a checkpoint can be reduced, as an example, from four hours to just five to ten minutes.

RECOVERY

Similarly, during recovery, the present invention reads the data back sequentially from the checkpoint files 208 corresponding to the most recent checkpoint and loads it into the main memory 205. In contrast, the prior art recovery procedure requires that the data be accessed on a piecemeal basis whereupon, data is loaded one piece at a time from the database into the main memory. Hence, the present invention significantly improves recovery time as well. With the present invention, once the main memory has been loaded with the contents of the most recent checkpointed data, the log files 207 are accessed to update the data to account for the changes made from the time of the most recent checkpoint to the time of the failure. Thereby, after the server node crashes and loses all data stored in its main memory, the recovery process loads the main memory with a replica of the lost data by reading the data that was copied into the checkpoint files and log files as retained by their respective hard disk drives. Thereupon, the server 204 can continue with its normal mode of operation. Eventually, the modified data in the checkpoint files are written back to the database residing on disk array 206.

In the currently preferred embodiment, several different hard disk drives 208, 210 and 211 are used as dedicated storage devices for the checkpoint files. In this manner, when a checkpoint process is initiated, modified data can be written to these hard disk drives simultaneously. As a result, this enhanced parallel transfer of data further speeds up the checkpointing process. Likewise, recovery can be finished much faster by reading the data back simultaneously through all three disk drives. It should also be noted that disk drives have different speeds (i.e., seek times). Some disk drives are faster, but they are more expensive. In the past, since checkpointing was to the database, all of the corresponding database disk drives (e.g., upwards of hundreds of disk drives 206) had to be fast in order to improve checkpointing and recovery times. However, with the present invention, the fastest disk drives can be used for storing the checkpoint and log files. Rather than spending money purchasing hundreds of high-speed disk drives, the present invention allows the database administrator to purchase only a few high-speed disk drives to achieve fast checkpointing and recovery.

Furthermore, by implementing segregated disk drives for storing the checkpointing files, contentions are minimized because they are not accessed by any other processes.

Figure 3:
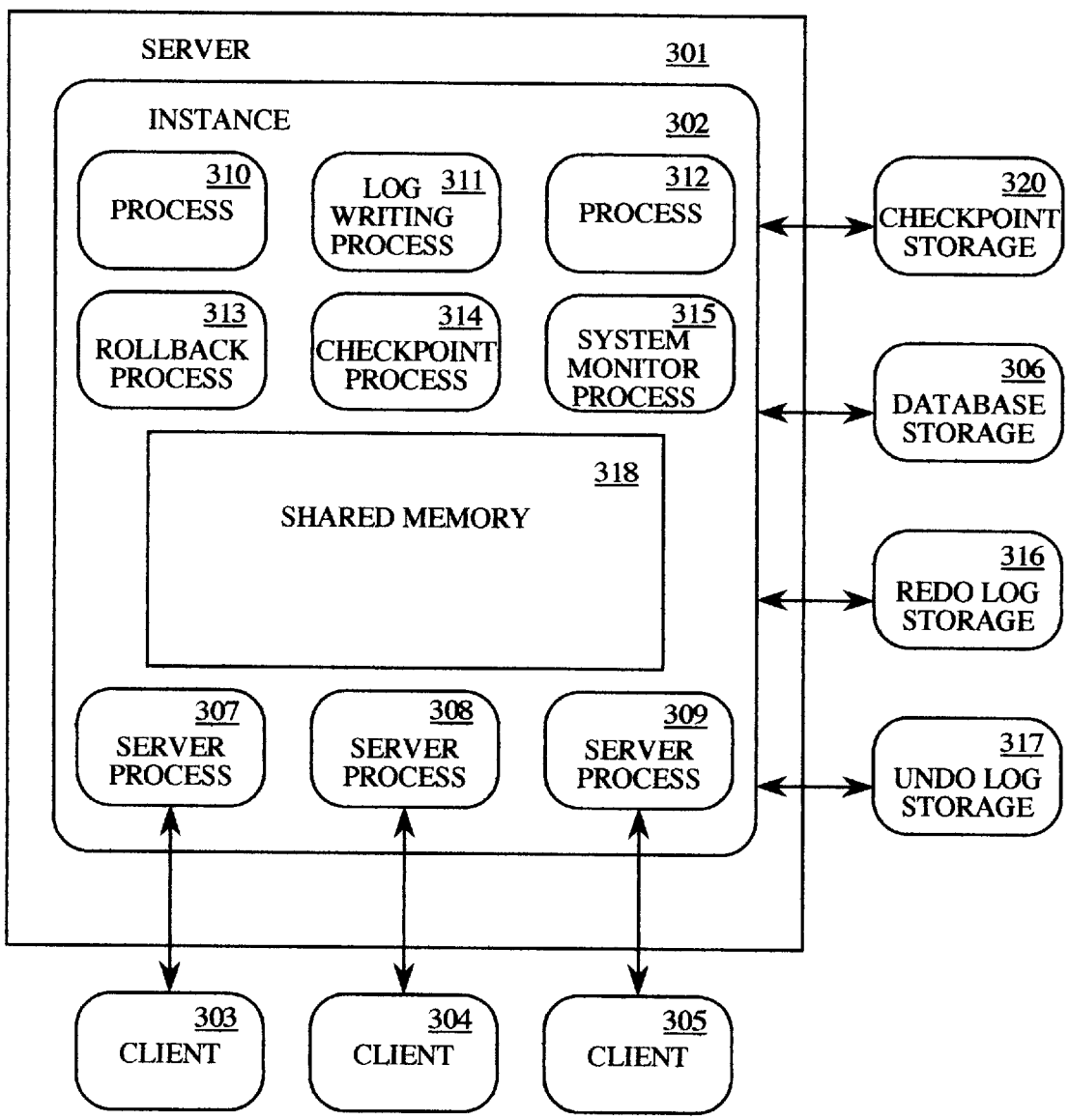
FIG. 3 shows how an instance of a database management system (DBMS) running on server acts as an interface between clients and a database residing within a mass storage device.

FIG. 3 shows how an instance 302 of a database management system (DBMS) running on server 301 acts as an interface between clients 303–305 and a database residing within mass storage 306. An instance 302 is a particular execution of the DBMS on server 301. Applications, such as payroll, inventory, human resources, etc., running on clients 303–305 interact with a corresponding server process 307–309. When a user signs on to a client, a connection is established between that client and server 301; one or more server processes are then spawned. These server processes, together with other dedicated processes 310–315, perform the requested tasks (e.g., fetch data, store data, edit data, etc.) with respect to the database. The server processes include a rollback process 313, a log writing process 311, a system monitor process 315, a checkpoint process 314, and a recovery process 312.

The rollback process 313 performs a rollback function whenever an inprogress transaction is deliberately halted by the user or when a transaction is prematurely halted due to server failure. In the first instance, a user controls whether a proposed transaction is allowed to be actually carried out. If the user wishes to cancel the proposed transaction, the rollback process renders that particular transaction ineffectual so that it has no effect whatsoever on the contents of the database. In other words, the rollback process cancels the proposed transaction so that, as far as the system in concerned, it is as if the transaction had never been entered. Otherwise, if the user is satisfied with the proposed transaction, the transaction is committed. Rollback is made possible by the log writing process 311, which writes information regarding in-flight transactions into a redo log 316. Copies of every transaction (e.g., a before image copy and an after image copy) which modify main memory 318 are stored in an undo log 317 and redo log 316. Each server contains its own copy of an undo log 317 for recording transactions associated with its clients. Each time a record is altered, the before image copy of that record is stored in the undo log 317. A common redo log 316 is used to store an after image copy of the altered record after the transaction is committed. Checkpoint process 314 is used to periodically read modified data from the shared memory 318 and store that data to checkpoint storage device 320. System monitor process 315 is used to perform any recovery that is needed at startup. It is also used to check the functionality of other services hooked up to the network and performs recovery in case of failures.

Figure 4A:
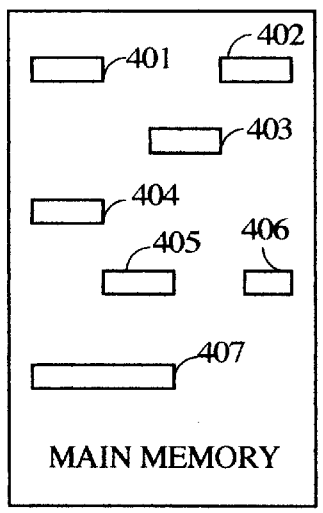
FIG. 4A shows a main memory having several pieces of data which have been modified by one or more of the clients.
Figure 4B:
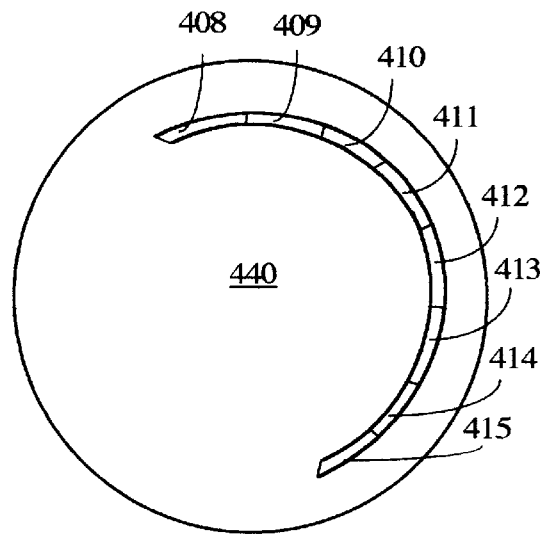
FIG. 4B shows three disks, upon which tables of a particular database reside.
Figure 4B:
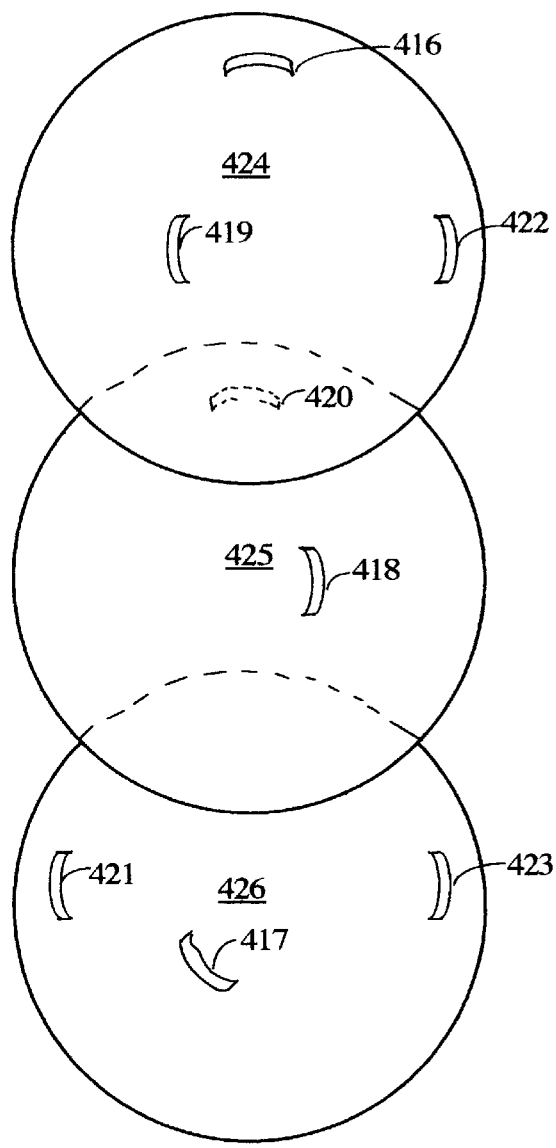

FIG. 4A shows a main memory having several pieces of data 401–407 which have been modified by one or more of the clients. During the next checkpoint process, the modified data 401–407 are written to the magnetic disk 440 of a hard disk drive in one continuous I/O operation. A write command is used to write the modified data into sequential, consecutive sectors 408–415. This can be accomplished by simply rotating the disk 440 and writing to sequential sectors of the same track. In contrast, FIG. 4B shows three disks 424–426, upon which tables of a particular database reside. In the prior art, each of the modified records 401–407 would have been written to its own corresponding table. These tables are stored in disks 424–426. The result is that the modified records 401–407 may be written to various sectors 416–423, depending on where their particular table resides. For example, modified record 401 might be written to sector 416. Consequently, the disk drive would perform a seek operation to place the transducer over sector 416. Next, modified record 402 might have to be written to sector 417. This requires another seek operation to rotate disk 426 and servo the transducer to place it over sector 417. This process is repeated for each of the modified records. All of these different seek operations consume a large amount of time, especially if thousands or millions of records need to be checkpointed.

Figure 5:
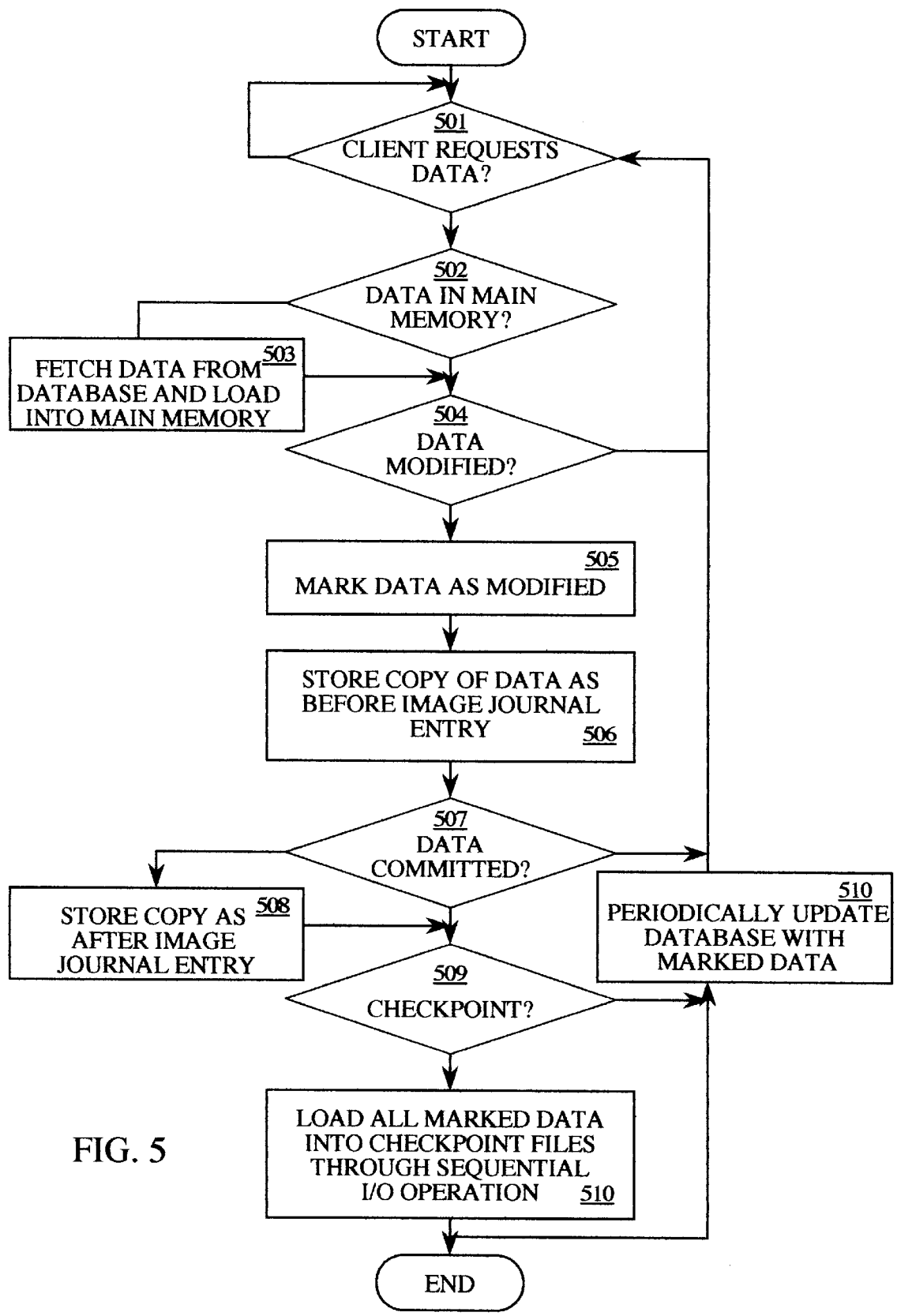
FIG. 5 is a flowchart describing the detailed steps for performing the checkpointing process according to the present invention.

FIG. 5 is a flowchart describing the detailed steps for performing the checkpointing process according to the present invention. Initially, when a client requests data, as determined in step 501, the server checks its main memory to determine whether a copy of the requested data currently exists in the cache, step 502. If a copy does not exist in the cache, the requested data has to be retrieved from the database and loaded into the main memory, step 503. Otherwise, the cache data is forwarded to the client. The client may then make changes to the data, step 504. If changes are made, the data is marked in the shared memory as having been modified, step 505. A marked copy of the modified data is then stored as a before image journal entry in the undo log, step 506. When the transaction corresponding to the modified data is committed, step 507, the marked copy is then stored as an after image journal entry in the redo log, step 508. A determination is made as to whether a checkpoint process is to be made in step 509. Because checkpointing can be accomplished much faster with the present invention, the system can perform checkpoints more frequently to decrease the time intervals in-between checkpoints. The effect is that recovery can be accomplished much faster because the checkpoint files contain more recent a copy of data. If a checkpoint operation is specified, copies of all marked data in the main memory is stored in a nonvolatile checkpoint file, step 511. This is accomplished through one or more sequential I/O operations. Finally, the database is periodically updated with the modified data, step 510.

Figure 6:
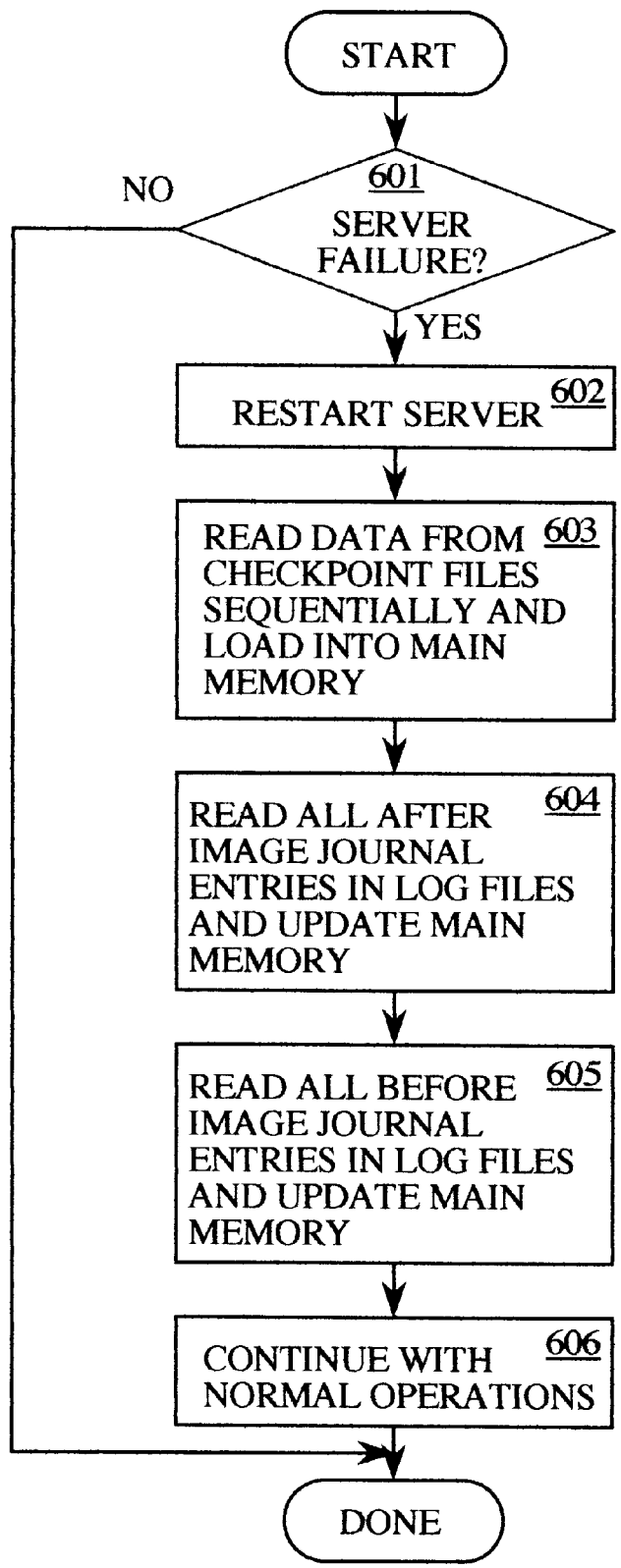
FIG. 6 is a flowchart describing the detailed steps for performing the recovery process according to the present invention.

FIG. 6 is a flowchart describing the detailed steps for performing the recovery process according to the present invention. Initially, the system monitor determines whether the server is working properly, step 601. If the server is working properly, it continues with its normal mode of operation, step 606. However, if the server becomes disabled (e.g., power failure), the database administrator restarts or reboots the server, step 602. Next, a recovery operation is used to recover the data that was dropped from the server's main memory due to the failure. This is accomplished by reading the copy of the modified data that was stored in the checkpoint files, step 603. The read operation is performed sequentially. This read data is loaded back into the server's main memory. Similarly, the before image journal entries that had occurred after the most recent checkpoint are read from the log files, step 604. The after image data is preferably read first and used to update the main memory data. Next, the before image journal entries that had occurred after the most recent checkpoint are also read from the log files, step 604 and used to update the main memory. Now, the server can continue with its normal mode of operations, step 606.

Figure 7:
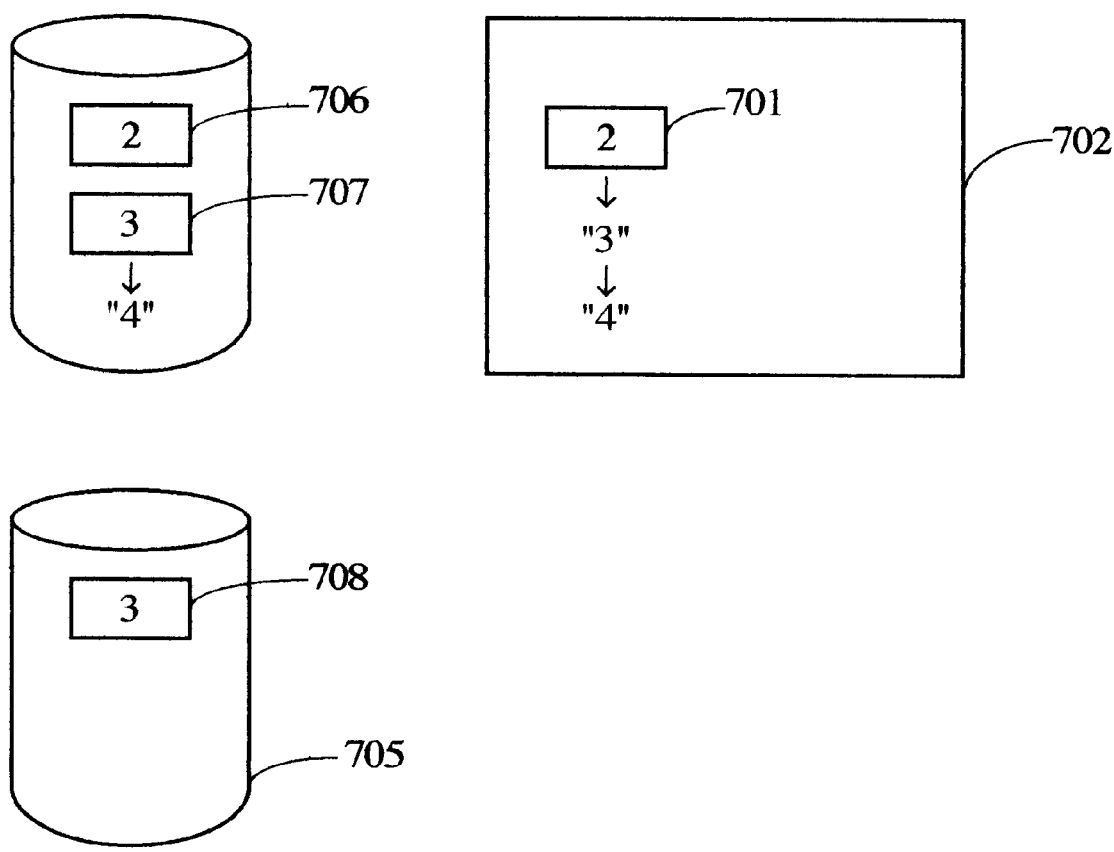
FIG. 7 shows an example of a checkpointing and log writing operation according to the present invention.

FIG. 7 shows an example of a checkpointing and log writing operation according to the present invention. Suppose that a client changes the content of record 701 from the number "2" to the number "3." The server first checks the cache 702 to determine whether record 701 is currently cached. If record 701 does not currently reside within the cache 702, the server goes to the disk containing record 701, fetches that particular page corresponding to record 701, and loads it into the page layer. Optionally, the server may load record 701 into a record cache. Next, the content of record 701 is modified from a "2" to a "3." A before image entry 706 of "2" corresponding to record 701 is stored in the undo log. Once the transaction committs, an after image entry 707 of "3" is stored in a separate redo log. The before image entry 706 of "2" can now be deleted. Standard bookkeeping operations are performed to track the location of record 701. During checkpointing time, record 701 is written into a special buffer. The size of the buffer is equivalent to the size of a single I/O operation (e.g., 127 blocks long). Once the buffer is filled, its contents are transferred sequentially to the checkpoint disk 705 through an asynchronous direct memory access (DMA). Hence, checkpoint disk 705 contains an entry 708 of "3" corresponding to record 701. Upon completion of checkpointing, the after image entry 707 of "3" corresponding to record 701 can be deleted from log files 704. If a failure occurs on the server node, the entry 708 is loaded back from the checkpoint disk from the cache memory 702 for record 701.

Now suppose that subsequent to the checkpoint, record 701 is changed from "3" to the number "4" and committed. This causes the after image entry 707 corresponding to record 701 to be changed from a "3" to a "4." Note that the checkpoint files still contain the value "3" for record 701. If the server node crashes, the recovery process loads the value "3" from the checkpoint files 705 into the record 701 location. Next, the log files 704 are consulted. Based on the after image entry 707 of log files 704, the server knows to change the contents of record 701 from a "3" to a "4."

LAZY WRITE BACK

Performing sequential checkpointing in the manner described greatly increases the speed of the checkpointing process. However, because the checkpointed information is written to a checkpoint disk rather than to the database, there needs to be a mechanism for eventually writing the modified data back to the database. Otherwise, the main memory would be completely filled with modified data; there would be no more free memory available for caching new pages and/or records. Hence, there must be a mechanism for unmarking modified data and clearing them from the cache. Modified data can be unmarked and its corresponding space in memory reclaimed only after it has been copied into the appropriate location in the database. Consequently, the present invention provides a mechanism for write-back of modified data back to the database associated with the high-speed checkpointing method described above. In the past, writeback operations were used to clear the entire cache. Essentially, the goal of the prior art systems was to keep the cache as "clean" as possible; all modified data was written back to the database as part of a checkpoint operation.

In contrast, the present invention clears a small portion of enough memory so that there is just enough memory available for new data to be cached. Rather than writing back all modified data and clearing the entire memory, the present invention determines an approximate amount of new data that is conservatively expected to be written to the cache. A corresponding number of modified data is then written back to the database to clear the cache so that there is room enough to accommodate all of the new data anticipated to be cached. There are several advantages to the present invention of only clearing a small portion of cache in order to meet anticipated demands. One advantage is that of improved efficiency. Since data is now written back on an as needed basis, fewer writeback operations are required. In addition, most of the "hot" data is kept in the cache rather than being written back. As a result, whenever a client requests a particular piece of "hot" data, that data already resides in the cache and does not have to be loaded from the database. This improved efficiency translates into faster response times. Furthermore, the writebacks can be performed opportunistically so as to have minimal impact on the system's overall performance as described below.

Figure 8:
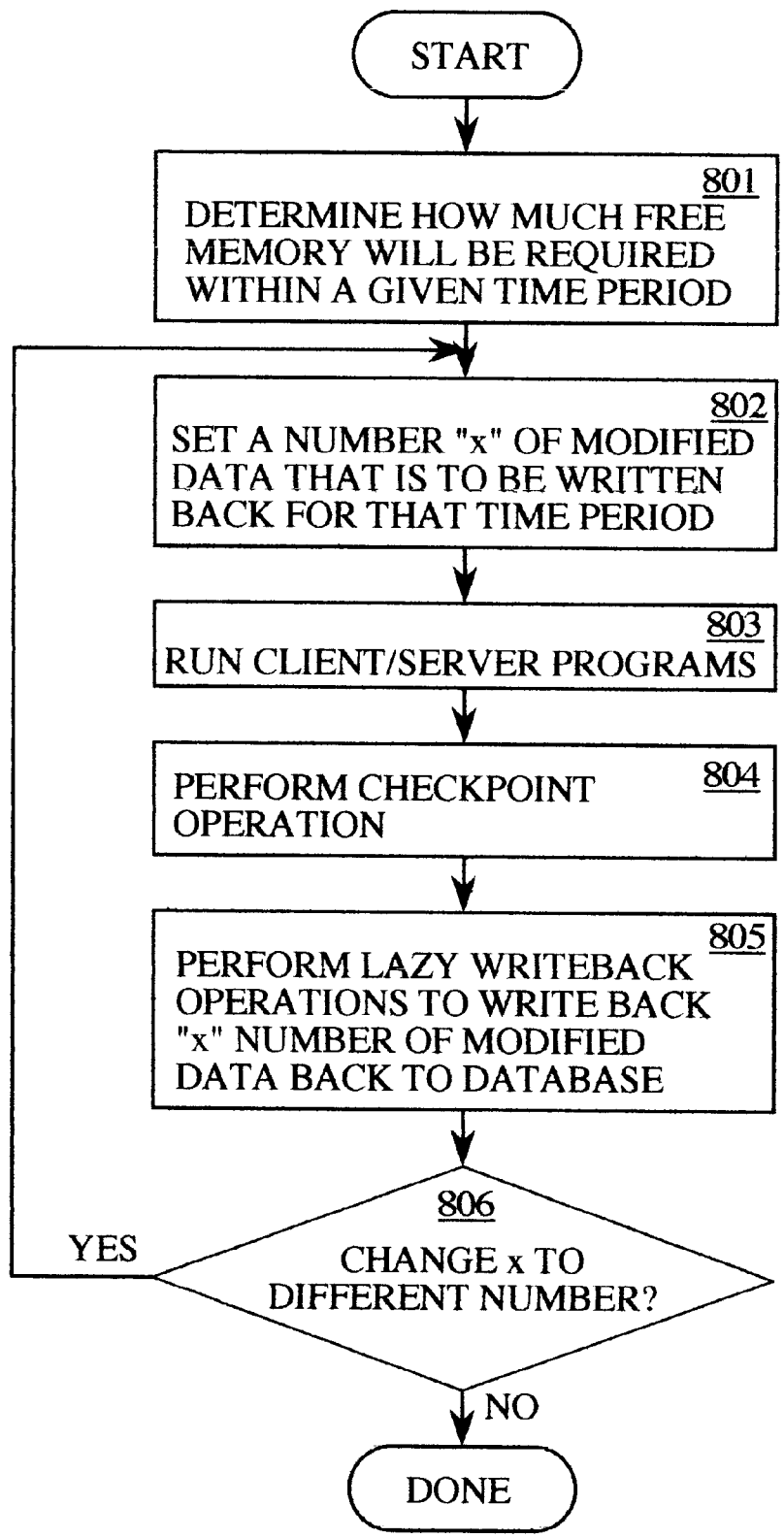
FIG. 8 is a flowchart describing the writeback operation according to the present invention.

FIG. 8 is a flowchart describing the writeback operation according to the present invention. Initially, a determination is made as to how much free memory is going to be required within a given time period, step 801. This determination is based on a number of factors, such as past history and experience, the particular applications that are running, the size and performance characteristics of the client/server system, etc. Based on this determination, the database administrator then sets a number of modified data that is to be written back from the cache to the database within the allotted time span, step 802. Thereafter, the client/server system continues with its normal mode of operation, step 803. Periodically, the server performs a checkpoint operation as described above, step 804. In the meantime, writebacks to the database are executed to clear the cache, step 805. The number of lazy writebacks to be performed can subsequently be changed by the database administrator, step 806. If the cache is becoming too clogged all the time, the database administrator can increase the number of data to be written back. Conversely, if too much of the cache is being cleared, the database administrator can decrease the number of data to be written back.

The present invention handles writebacks with a two-pronged strategy to minimize the impact on overall system performance. The first writeback approach involves using the resources provided by the record cache server (RCS). Basically, an RCS sweeper process is used to copy modified data back to the database according to a predetermined moderated sweep. In the currently preferred embodiment, the RCS sweeper process looks for each marked record, reads the corresponding page in which the record belongs, copies the record into the page, and unmarks the record. The number of records swept per second is a controllable function. This smoothes out the impact of the sweep function on the overall system behavior.

Figure 9:
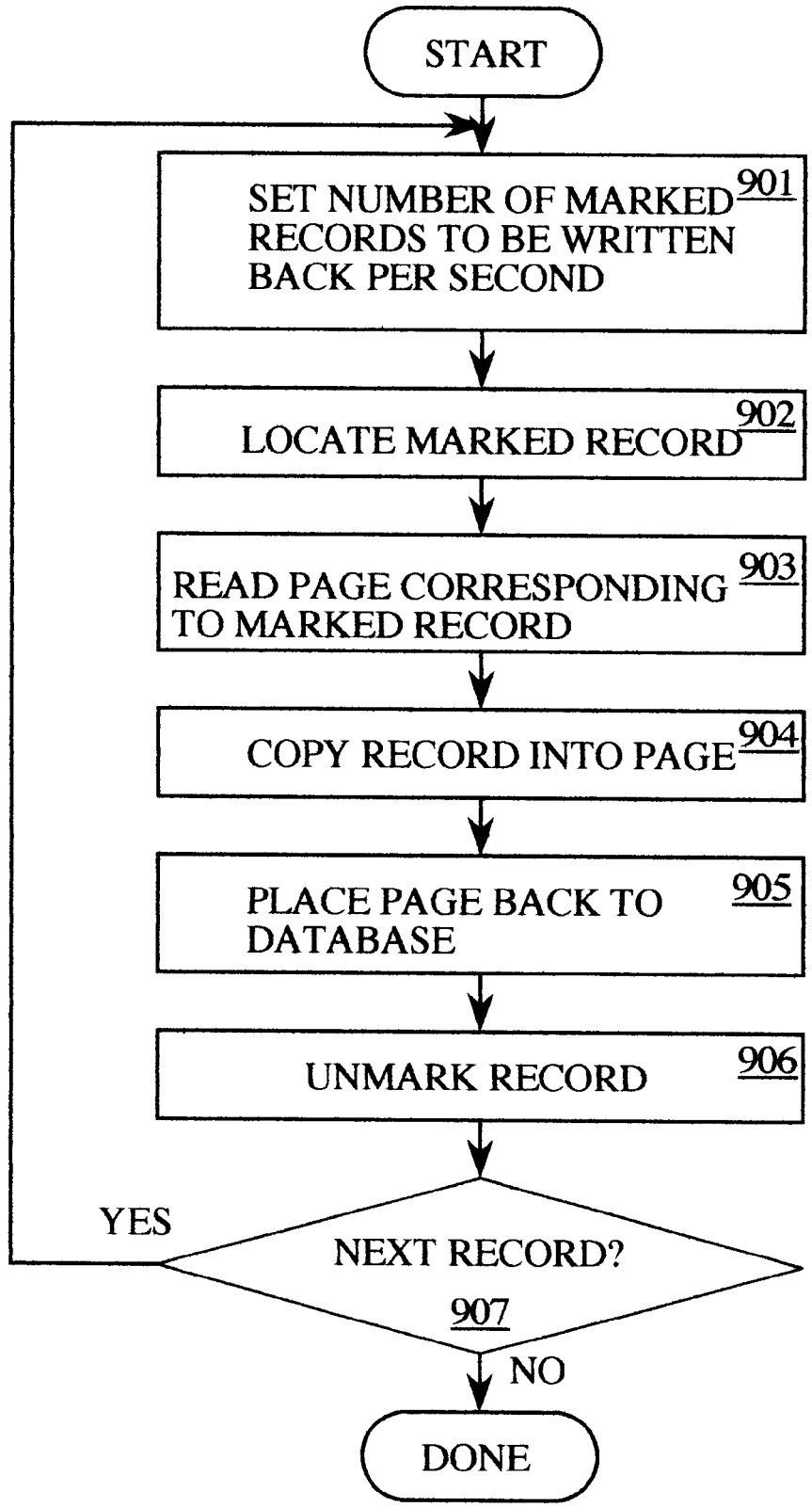
FIG. 9 is a flowchart describing in detail the steps for performing a moderated RCS sweeper process.

FIG. 9 is a flowchart describing in detail the steps for performing a moderated RCS sweeper process. Initially, the database administrator sets the number of modified or marked records to be swept per second, step 901. Steps 902–907 correspond to the sweeper process. In step 902, a marked record is located by the RCS sweeper process. If the page corresponding to that marked record is currently not opened, it is fetched from the database, step 903. The marked record is then copied into that page, step 904. Later, the page is placed back to the database, step 905. The record is unmarked, step 906. A determination is made as to whether an additional marked record is to be swept, step 907.

The second writeback approach involves employing the help of certain user processes for writing back modified records. This writeback approach is attractive because it is opportunistic and has a relatively small impact on the system performance. Basically, whenever a transaction commits, the user process checks the records that it has modified. If the page in which this record resides happens to be available in memory (i.e., in the page cache or local buffer pool), the transaction just copies the modified record into the page. Thereby, this approach avoids the performance penalty of reading the page from the database residing on the disk array. Once the record is copied into the page, the record can then be immediately unmarked. As a result, marked records are cleared extremely quickly by simply writing it back to its corresponding page. Thereafter, user process is finished with that record. It can immediately start processing another task and does not have to wait until the page gets written back to the disk. There is no urgency for writing the page back to disk. This can be performed anytime. Hence, this type of writeback scheme is referred to as being a "lazy" writeback. Eventually, the page gets written back to the database according to one of several possible replacement schemes. One such replacement scheme is that of replacing the least recently used (LRU) page. The page will slowly migrate out of the buffer pool and fall off the end when the page cache is cycled through. This strategy is extremely useful for records that are modified once and never reused in the foreseeable future. Since such a record would most likely be fetched from disk when first used, its retaining page is likely to be in memory when the transaction commits.

Figure 10:
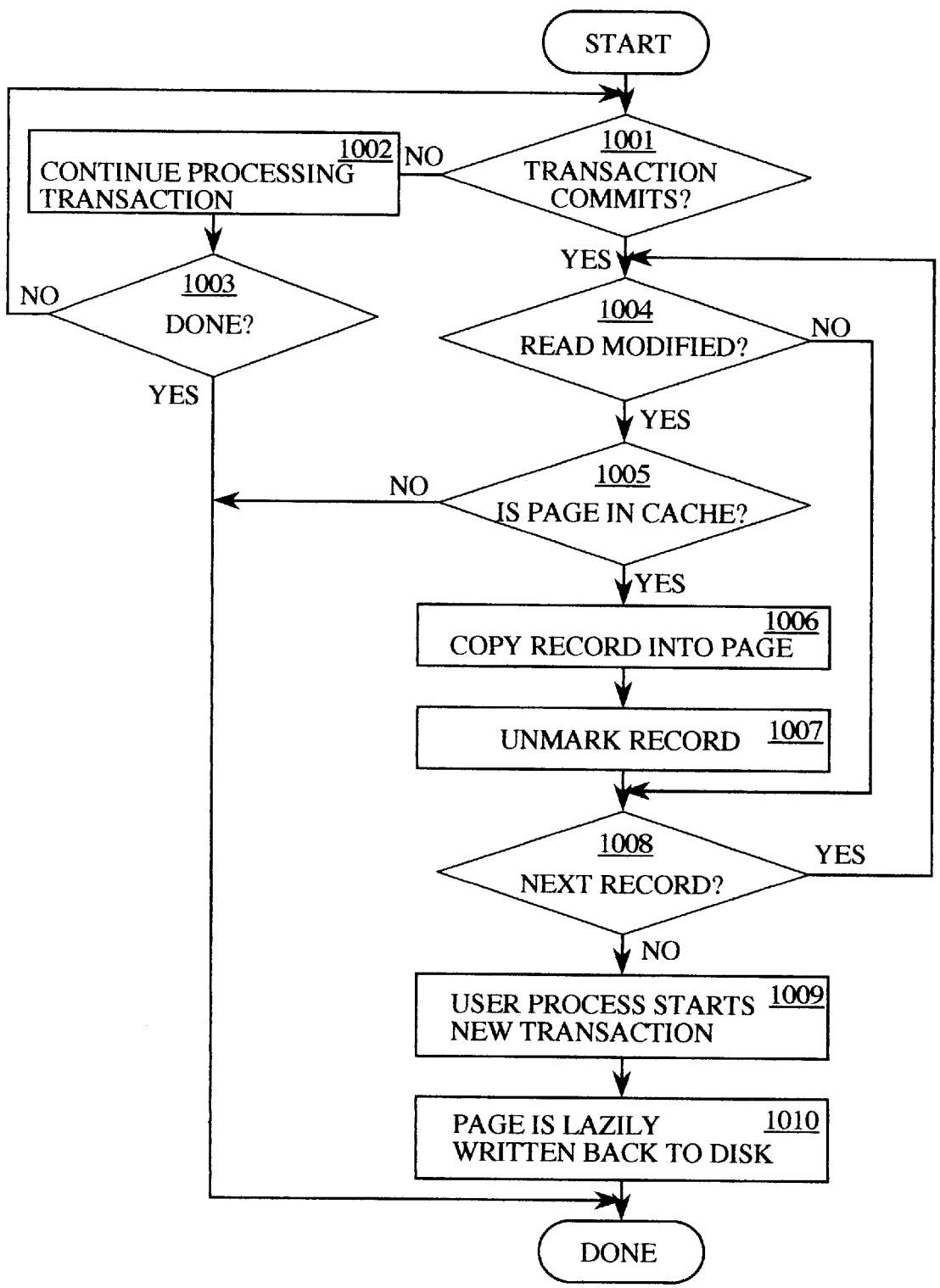
FIG. 10 is a flowchart showing the detailed steps for utilizing a user process to clear marked records.

FIG. 10 is a flowchart showing the detailed steps for utilizing a user process to clear marked records. Initially, one or more records are accessed by a user process. The user may read the accessed records and decide to make certain updates or modifications to these records. If the user desires to make the changes permanent, the transaction is committed. Otherwise, the changes are not made and the records retain their original status. Step 1001 monitors the case whereby a transaction is committed. If the transaction is not committed, it continues until it is done, steps 1002–1003. Whenever a transaction does commit, a determination is made as to whether one of its associated records has been modified, step 1004. If the current record has not been modified, the next record affiliated with the committed transaction is examined to determine whether it has been modified, step 1008. In this manner, all records associated with the committed transaction are individually examined to determine whether it has been modified.

If a record has been modified, a determination is made as to whether the page corresponding to that particular marked record coincidentally happens to be in the page cache, step 1005. A page could be in memory coincidentally because multiple tables of records are contained in a page. If the page is not currently in the page cache, then nothing happens; the record remains marked. However, if the page currently resides in the page cache, the record is copied into that page, step 1006. That record can immediately be unmarked, and its space in the record cache becomes available, step 1007. Note that the record can be unmarked without the attendant penalty of an I/O operation. This advantage is possible because a copy of the most recent record is stored in the log file. After all records corresponding to the committed transaction have been thusly cycled through, the user process may start a new transaction, step 1009. Eventually, the page is lazily written back to the disk, step 1010.

In one embodiment of the present invention, a number of user processes are designated to help in the writeback of marked records. These "helper" processes perform their routine transactions as programmed. However, in the course of their normal transaction execution, if a helper process happens to touch (i.e., read or modify) any marked record in the cache, it will write back and unmark that modified record. This is accomplished by fetching the corresponding page from the disk array, copying the record onto that page, and writing the page back to the database residing on the disk array. The main advantage for having multiple helper processes over just a single RCS sweeper process is that the RCS sweeper occasionally attempts to write out a marked record that is currently locked by an active user process. The marked record is locked because the user process is engaged in modifying that record. As such, all other processes are prevented from accessing that record until the lock is released. Hence, the RCS sweeper must wait for release of the lock or it can skip over that record in the process of sweeping through the cache. Now, the helper process holding the lock has the capability of writing out and unmarking the record. Hence, no additional locks would be needed, and lock conflicts would be avoided as well. However, it defeats the purpose of the record cache if all processes were to be designated as helper processes. Consequently, the database administrator should designate only those user processes as helpers that have lax response time requirements. Furthermore, for any such designated helper process, the database administrator can also indicate how many records per transaction should be swept. When that maximum count is reached, the transaction should stop sweeping so that it can meet its response time requirements.

As an example, suppose that the task of user process "A" is to take in new sales orders and update the appropriate sales records. Hence, it is imperative that process "A" executes new orders as fast as possible. Otherwise, if the time response were to be too slow, new sales might be lost as they might be prevented from being accepted. On the other hand, suppose that the task of a user process "B" is that of a report writer which is used to keep a tally of the revenues on a quarterly basis. In this situation, there is much less urgency in having user process "B" complete its transaction as quickly as possible. The consequences of having to wait a couple of minutes for the report to be generated is not severe. Consequently, the database administrator can assign user process "B" as a designated helper. Now, whenever a new sales order is received, user process "A" simply fetches the page corresponding to the appropriate record from the disk array, caches the record, modifies the record according to the new information, and marks the record. It should be noted that user process "A" is not required to write the modified record back to the database on the disk array. Instead, user process "A" can immediately accept and start processing the next order. Later, when designated helper process "B" goes to read that particular record, it takes notice that the record is marked. In response, designated helper process "B" copies the record onto the corresponding page. If the page is not currently in the page layer, it is fetched from the disk array. The page is then eventually flushed from the cache by an LRU process. In addition, other user processes, such as billing, invoice, order manifest, etc., can be selected as designated helpers to aid in the writeback of marked records as well.

Figure 11:
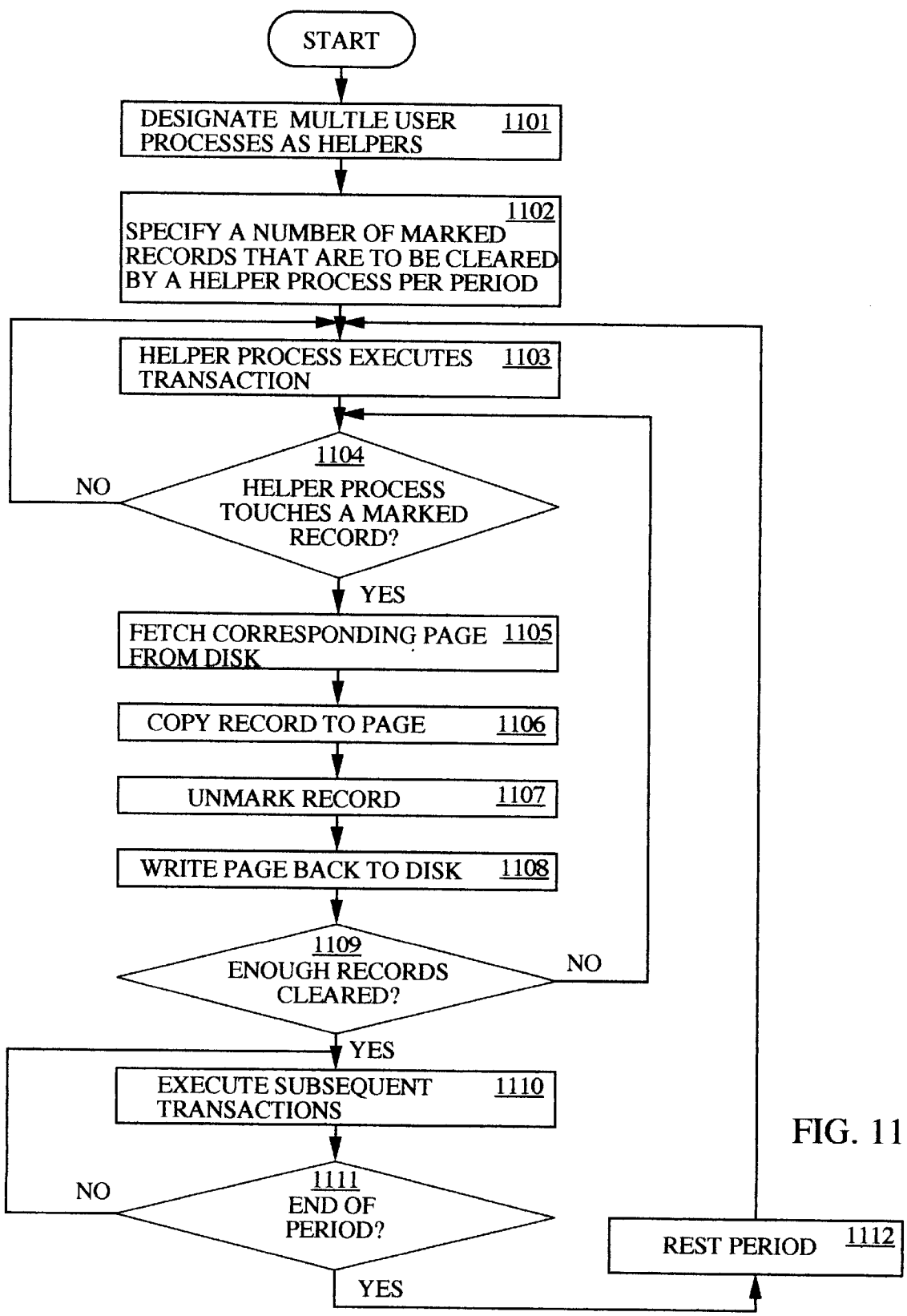
FIG. 11 is a flowchart describing the steps for utilizing multiple helper processes to aid in the writeback of marked records.

FIG. 11 is a flowchart describing the steps for utilizing multiple helper processes to aid in the writeback of marked records. Initially, the database administrator designates multiple user processes as helpers, step 1101. The database administrator also specifies a number of marked records that are to be cleared by each of the helper processes per second, step 1102. The helper processes perform their regular course of executing transactions. In the course of executing their transactions, a determination is made as to whether a marked record happens to be touched. If no marked record is touched, the helper processes continue with their normal mode of operation, step 1103. Otherwise, if a marked record is touched, that particular record is written back and cleared according to steps 1105–1108. In step 1105, the page corresponding to the marked record is fetched from the disk array. The marked record is copied onto that page and then cleared, steps 1106 and 1107. The page is eventually written back to the disk array, step 1108. In step 1109, a determination is made as to whether the helper process has completed all of its designated number of marked records for that time period. If additional records need to be cleared by that helper process during the current time period, step 1104 is repeated. Otherwise, that particular helper process continues execution of subsequent transactions without anymore writebacks of marked records until the time period has elapsed, steps 1110–1111. Whereupon, the time period is reset, step 1112.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a client/server computer system, a method for writing data that has been modified and which is stored in a cache memory to an appropriate location of a database stored in a magnetic storage device, comprising the steps of:

designating an amount of the cache memory that is to be cleared within a predetermined time interval, wherein the amount of cache memory to be cleared is based on an estimate of how much new data is anticipated to be cached in the cache memory within the time interval;

copying a piece of modified data from the cache memory to the database;

determining whether an additional amount of cache memory needs to be cleared, wherein additional pieces of modified data are copied from the cache memory to the database until the designated amount of cache memory becomes available for storage of new data;

checkpointing modified data to a checkpoint file with at least one sequential input/output operation;

identifying a marked record in the cache memory;

opening a page corresponding to the marked record;

copying the marked record to the page;

unmarking the record;

regulating a number of marked records to be cleared within the time interval;

storing the new data in the designated amount of cache memory that has been cleared.

2. The method of claim 1 further comprising the steps of:

committing a transaction;

determining whether a page corresponding to a record that was modified by the transaction is available in a page cache;

writing the record to the page if the page is available in the page cache;

unmarking the record after the record is written to the page.

3. The method of claim 2 further comprising the step of eventually writing the page back to the database with a least recently used process.

4. The method of claim 1 further comprising the steps of:

designating a first process to modify data in the cache memory;

designating a second process to write the data that was modified by the first process back to the database.

5. A server computer comprising:

an interface for interfacing the server computer with a plurality of client computers for running application programs;

a database management system installed within the server for handling access to a database residing within a mass storage device;

a checkpoint file to which modified data stored in the memory is written to the checkpoint by a sequential input/output operation;

a circuit for performing a modulated sweep function for controlling a number of modified data that is to be cleared from the memory within the time interval;

a circuit which determines after a transaction commits, whether a page corresponding to a record that was modified by the transaction is available in a page cache, wherein the record is written to the page if the page is available in the page cache and unmarked;

a memory residing within the server computer method for storing data read from the database, wherein an amount of the memory is designated to be cleared within a pre-determined time interval based on an estimate of how much new data is anticipated to be stored in the memory within the time interval such that the memory is continuously being cleared so that just enough memory becomes available for storing the new data.

6. The client/server computer system of claim 5 further comprising a process which eventually writes a least recently used page back to the database.

7. The client/server computer system of claim 5 further comprising:

a first process which modifies data in the memory;

a second process which writes the data that was modified by the first process back to the database.

8. A computer-readable medium having stored thereon instructions for causing a computer system to write data that has been modified and which is stored in a memory to a database stored in a magnetic storage device, said instructions causing the computer system to carry out the steps of:

designating an amount of the memory that is to be cleared within a predetermined time interval, wherein the amount of memory to be cleared is based on an estimate of how much new data is anticipated to be stored in the memory within the time interval;

copying modified data from the cache memory to the database;

determining whether an additional amount of cache memory needs to be cleared, wherein additional modified data are copied from the cache memory to the database until the designated amount of memory becomes available for storage of new data;

checkpointing modified data to a checkpoint file with at least one sequential input/output operation;

identifying a marked record in the memory;

opening a page corresponding to the marked record;

copying the marked record to the page;

unmarking the record;

regulating a number of marked records to be cleared within the time interval;

storing the new data in the designated amount of memory that has been cleared.

9. The computer readable medium of claim 8 further comprising the steps of:

committing a transaction;

determining whether a page corresponding to a record that was modified by the transaction is available in a page cache;

writing the record to the page if the page is available in the page cache;

unmarking the record after the record is written to the page.

10. The computer readable medium of claim 9 further comprising the step of eventually writing the page back to the database with a least recently used process.

11. The computer readable medium of claim 8 further comprising the steps of:

designating a first process to modify data in the cache memory;

designating a second process to write the data that was modified by the first process back to the database.

12. In a client/server computer system, a method for writing modified data stored in a cache memory back to a database stored in a mass storage device by a helper process, comprising the steps of:

processing a set of data stored in said cache memory by a plurality of user processes;

checkpointing modified data to a checkpoint file with at least one sequential input/output operation;

identifying a marked record in the memory;

opening a page corresponding to the marked record;

copying the marked record to the page;

unmarking the record;

designating one of the plurality of user processes as being said helper process, wherein said helper process is used to write back modified data;

determining whether said helper process has processed a set of data that has been modified;

in response to a determination that said helper process has processed said set of data that has been modified, writing said set of data that has been modified from the cache memory back to said database stored in said mass storage device.

13. A client/server computer system, comprising:

a plurality of client computers in a computer network;

a mass storage device coupled to said client computers for storing a database;

a server computer having a main memory coupled to said client computers and said mass storage device upon which a plurality of user processes are running to process data stored in said main memory, wherein one of said user processes is designated as being a helper process used to write back modified data from said main memory to said database of said mass storage device;

a checkpoint file to which modified data stored in the memory is written to the checkpoint by a sequential input/output operation;

a circuit for performing a modulated sweep function for controlling a number of modified data that is to be cleared from the memory within the time interval;

a circuit which determines after a transaction commits, whether a page corresponding to a record that was modified by the transaction is available in a page cache, wherein the record is written to the page if the page is available in the page cache and unmarked.

14. A computer-readable medium having stored thereon instructions for causing a computer system to write data that has been modified and which is stored in a memory to a database stored in a magnetic storage device, comprising the steps of:

processing a set of data stored in a cache memory by a plurality of user processes;

checkpointing modified data to a checkpoint file with at least one sequential input/output operation;

identifying a marked record in the memory;

opening a page corresponding to the marked record;

copying the marked record to the page;

unmarking the record;

designating one of the plurality of user processes as being said helper process, wherein said helper process is used to write back modified data;

determining whether said helper process has processed a set of data that has been modified;

in response to a determination that said helper process has processed said set of data that has been modified, writing said set of data that has been modified from the cache memory back to said database stored in a mass storage device.

* * * * *